United States Patent
Kiyoshige (10) Patent No.: US 9,210,278 B2
(45) Date of Patent: Dec. 8, 2015

(54) IMAGE CAPTURING DEVICE, IMAGE CAPTURING SYSTEM, IMAGE CAPTURING METHOD, AND PROGRAM DEVICE

(71) Applicant: Olympus Corporation, Shibuya-ku, Tokyo (JP)

(72) Inventor: Ryuichi Kiyoshige, Tokyo (JP)

(73) Assignee: Olympus Corporation, Tokyo (JP)

( * ) Notice: Subject to any disclaimer, the term of this patent is extended or adjusted under 35 U.S.C. 154(b) by 78 days.

(21) Appl. No.: 14/227,598

(22) Filed: Mar. 27, 2014

(65) Prior Publication Data

US 2014/0340559 A1    Nov. 20, 2014

(30) Foreign Application Priority Data

May 20, 2013    (JP) ................................. 2013-106621

(51) Int. Cl.
*H04N 1/00* (2006.01)
*H04N 5/232* (2006.01)

(52) U.S. Cl.
CPC ....... *H04N 1/00129* (2013.01); *H04N 5/23206* (2013.01); *H04N 5/23296* (2013.01)

(58) Field of Classification Search
CPC . H04N 5/23293; H04N 5/232; H04N 5/2628; H04N 5/772; H04N 2101/00
USPC .................................................. 348/333.12
See application file for complete search history.

(56) References Cited

U.S. PATENT DOCUMENTS

2011/0096142 A1*   4/2011   Kiyoshige ....................... 348/36
2013/0120534 A1*   5/2013   Sakamoto et al. ............... 348/46

FOREIGN PATENT DOCUMENTS

| JP | A-2003-060975 | 2/2003 |
|----|---------------|--------|
| JP | 2006-211378   | 8/2006 |
| JP | 2008-048008   | 2/2008 |
| WO | WO 2013/051547 | 4/2013 |

OTHER PUBLICATIONS

Office Action from corresponding Japanese Patent Application No. 2013-106621 (4 pgs.), mailed Jan. 27, 2015, with translation (5 pgs.).

* cited by examiner

*Primary Examiner* — Twyler Haskins
*Assistant Examiner* — Fayez Bhuiyan
(74) *Attorney, Agent, or Firm* — John C. Pokotylo; Straub & Pokotylo (57) ABSTRACT

Provided is an image capturing device including: an image capturing element that performs image capturing to generate first image capturing data; a posture detection unit that detects a posture of the image capturing element to output first posture information; a communication unit that wirelessly receives second posture information about a posture of a display unit and size information about a size of an array of pixels from a display device and wirelessly transmits second image capturing data generated from the first image capturing data to a display device; and an image processing unit that generates the second image capturing data by segmenting data, which corresponds to an image area corresponding to the size represented by the size information, from the first image capturing data according to a difference between the posture of the image capturing element and the posture of the display unit.

7 Claims, 7 Drawing Sheets

IMAGE CAPTURING DEVICE, IMAGE CAPTURING SYSTEM, IMAGE CAPTURING METHOD, AND PROGRAM DEVICE

BACKGROUND OF THE INVENTION

1. Field of the Invention

The present invention relates to image generation technology in an image capturing system in which an image capturing unit and a display unit are separated.

Priority is claimed on Japanese Patent Application No. 2013-106621, filed May 20, 2013, the content of which is incorporated herein by reference.

2. Description of the Related Art

Recently, smartphones have become widespread. Accordingly, when shooting is performed by a digital camera, a user can freely experience a remote live view function by controlling the digital camera while checking a live view video in the smartphone.

A size of an image output by an image capturing device such as the digital camera is different from a size of an image capable of being displayed by a display device of the smartphone or the like, and it is desirable to use the image capturing device capable of outputting an image suitable for the display device. In Japanese Unexamined Patent Application, First Publication No. 2003-60975 (hereinafter referred to as Patent Literature 1), a captured image communication system including a camera capable of automatically acquiring the number of vertical pixels and the number of horizontal pixels of a display device and capturing an image suitable for the display device and the display device configured to display the image captured by the camera is disclosed.

SUMMARY

According to an aspect of the present invention, an image capturing device includes an image capturing element configured to perform image capturing to generate first image capturing data; a posture detection unit configured to detect a posture of the image capturing element to output first posture information; a communication unit configured to wirelessly receive second posture information about a posture of a display unit and size information about a size of an array of pixels from a display device having the display unit in which the pixels are two-dimensionally arrayed and wirelessly transmit second image capturing data generated from the first image capturing data to the display device; and an image processing unit configured to generate the second image capturing data by segmenting data corresponding to an image area corresponding to the size represented by the size information from the first image capturing data according to a difference between the posture of the image capturing element estimated from the first posture information and the posture of the display unit estimated from the second posture information.

In addition, according to an aspect of the present invention, an image capturing system includes an image capturing device; and a display device having a display unit in which pixels are two-dimensionally arrayed, wherein the image capturing device includes: an image capturing element configured to perform image capturing to generate first image capturing data; a first posture detection unit configured to detect a posture of the image capturing element to output first posture information; a first communication unit configured to wirelessly receive second posture information about a posture of the display unit and size information about a size of an array of the pixels from the display device and wirelessly transmit second image capturing data generated from the first image capturing data to the display device; an image processing unit configured to generate the second image capturing data by segmenting data corresponding to an image area corresponding to the size represented by the size information from the first image capturing data according to a difference between the posture of the image capturing element estimated from the first posture information and the posture of the display unit estimated from the second posture information, and wherein the display device includes: a second communication unit configured to wirelessly transmit the second posture information and the size information to the image capturing device and wirelessly receive the second image capturing data from the image capturing device; the display unit configured to display an image based on the second image capturing data; and a second posture detection unit configured to detect the posture of the display unit and output the second posture information.

In addition, according to an aspect of the present invention, an image capturing method includes the steps of: detecting, by a second communication unit of a display device having a display unit in which pixels are two-dimensionally arrayed, a posture of the display unit and wirelessly transmitting second posture information output from a second posture detection unit configured to output the second posture information about the posture of the display unit and size information about a size of an array of the pixels to an image capturing device; wirelessly receiving, by a first communication unit of the image capturing device, the second posture information and the size information from the display device; detecting a posture of an image capturing element of the image capturing device and generating, by an image processing unit of the image capturing device, second image capturing data by segmenting data corresponding to an image area corresponding to the size represented by the size information from first image capturing data generated by the image capturing element according to a difference between a posture of the image capturing element estimated from the first posture information output from the posture detection unit configured to output the first posture information and a posture of the display unit estimated from the second posture information; wirelessly transmitting, by the first communication unit of the image capturing device, the second image capturing data to the display device; wirelessly receiving, by the second communication unit of the display device, the second image capturing data from the image capturing device; and displaying, by the display unit of the display device, an image based on the second image capturing data.

In addition, according to an aspect of the present invention, a program device saves a program for causing a computer to execute the steps of: causing a communication unit to wirelessly receive second posture information about a posture of a display unit and size information about a size of an array of pixels from a display device having the display unit in which the pixels are two-dimensionally arrayed; causing an image processing unit to detect a posture of an image capturing element and generate second image capturing data by segmenting data corresponding to an image area corresponding to the size represented by the size information from first image capturing data generated by the image capturing element according to a difference between the posture of the image capturing element estimated from first posture information output from a posture detection unit configured to output the first posture information and the posture of the display unit estimated from the second posture information; and causing the communication unit to wirelessly transmit the second image capturing data to the display device.

DETAILED DESCRIPTION OF THE PREFERRED EMBODIMENTS

Hereinafter, an embodiment of the present invention will be described with reference to the drawings. In this embodiment, an image capturing system having an image capturing device and a display device will be described as an example of an image capturing system in which an image capturing unit and a display unit are physically separated. In addition, in this embodiment, an image capturing method using this image capturing system will be described.

Figure 1:
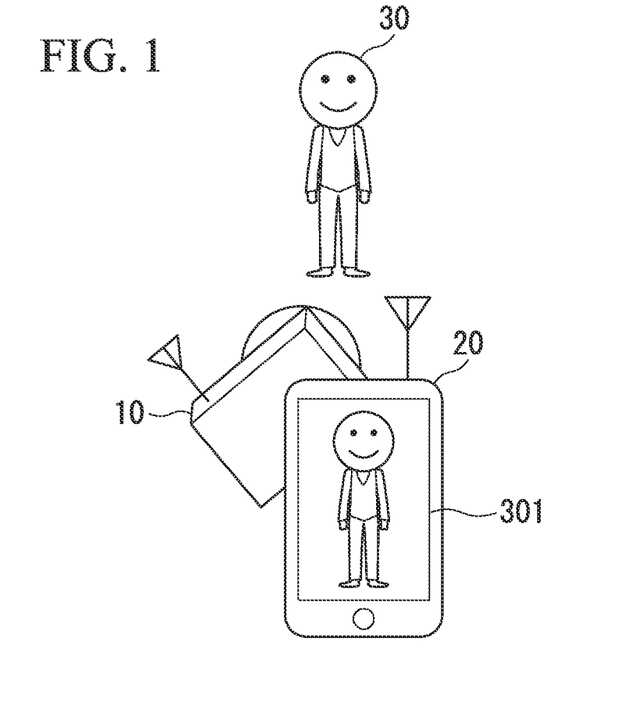
FIG. 1 is a reference diagram illustrating a situation in which shooting is performed in an embodiment of the present invention.

FIG. 1 illustrates an example of a situation in which shooting is performed in this embodiment. The image capturing system according to this embodiment includes an image capturing device 10 and a display device 20. When a subject 30 is shot, the image capturing device 10 having an image capturing function is directed to the subject 30 and the display device 20 having a function of displaying a captured image is maintained in a posture in which it is easy for a photographer to view the image. The tilt of the image obtained by the display device 20 is adjusted according to a difference between postures (tilts) of the image capturing device 10 and the display device 20. Thus, the subject 30 has the same tilt as the actual tilt in the image displayed on the display unit 301 of the display device 20.

Figure 2:
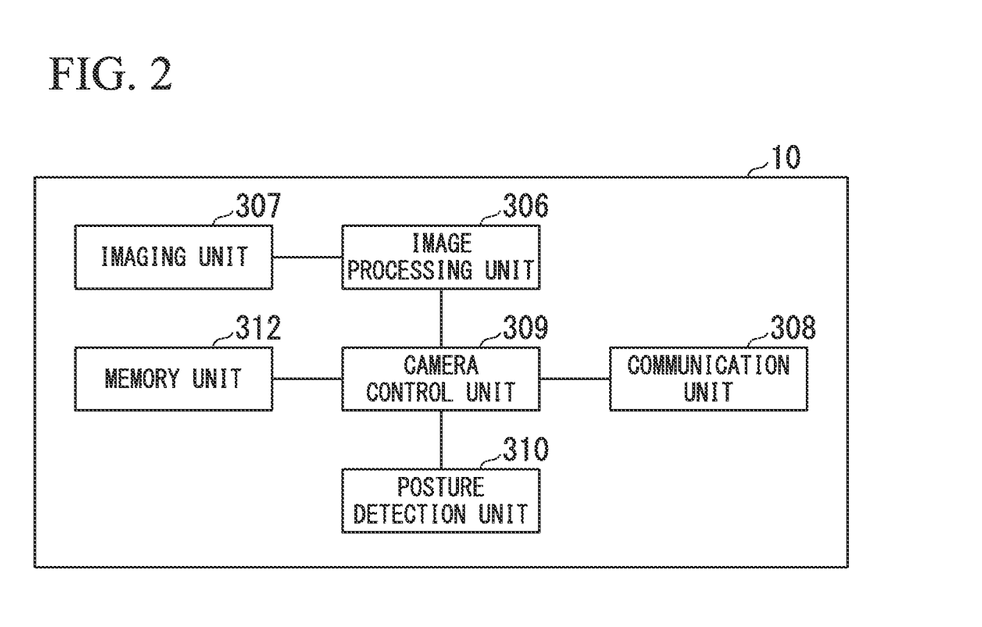
FIG. 2 is a block diagram illustrating a configuration of an image capturing device according to the embodiment of the present invention.

FIG. 2 illustrates a configuration of the image capturing device 10. The image capturing device 10 includes an image processing unit 306, an image capturing unit 307, a communication unit 308, a camera control unit 309, a posture detection unit 310, and a memory unit 312.

The image capturing unit 307 includes a lens configured to guide light to an image capturing element (an image capturing sensor or an image capturing module) and the image capturing element configured to receive the light and convert an analog signal generated by the light into a digital signal, and generates image capturing data (first image capturing data) by performing image capturing. The posture detection unit 310 (first posture detection unit) is a sensor configured to detect a posture of the image capturing element provided in the image capturing unit 307 and output posture information (first posture information) representing the detected posture. The posture detected by the posture detection unit 310 is a rotation angle relative to an optical axis of the image capturing element.

The image processing unit 306 is an image processing circuit (an image processing module or an image processing device) configured to perform image processing on image capturing data generated by the image capturing element. More specifically, the image processing unit 306 generates image capturing data (second image capturing data) for a display by segmenting (extracting) data corresponding to an image area corresponding to a size represented by size information about a size of an array of pixels provided in the display unit 301 from image capturing data (first image capturing data) generated by the image capturing element according to a difference between the posture of the image capturing element estimated from posture information output from the posture detection unit 310 and the posture of the display unit 301 estimated from posture information wirelessly received from the display device 20.

The communication unit 308 (first communication unit) is a communication interface (a communication module or a communication device) which wirelessly communicates with the display device 20. More specifically, the communication unit 308 wirelessly receives the posture information about the posture of the display unit 301 and the size information about the size of the array of the pixels provided in the display unit 301 from the display device 20 and wirelessly transmits the image capturing data for the display generated from the image capturing data generated by the image capturing element to the display device 20. In addition, the communication unit 308 wirelessly receives a shooting instruction from the display device 20 and wirelessly transmits captured image data to the display device 20.

The camera control unit 309 is a control circuit (a control module or a control device) configured to control an overall system of the image capturing device 10. The camera control unit 309 may have a function of the image processing unit 306. The memory unit 312 is a recording medium configured to store a control program, etc.

For example, a computer (central processing unit (CPU)) of the image capturing device 10 reads and executes a program stored in the memory unit 312, and therefore a function of the camera control unit 309 is implemented as a software function. In addition, this program, for example, may be provided by a "computer-readable recording medium" such as a flash memory. In addition, the above-described program may be input to the image capturing device 10 by transmitting the program from a computer storing the program in a storage device or the like to the image capturing device 10 via a transmission medium or transmission waves of the transmission medium. Here, the "transmission medium" for transmitting the program refers to a medium having a function of transmitting information like a network (communication network) such as the Internet or a communication circuit (communication line) such as a telephone circuit. In addition, the above-described program may be used to implement some of the above-described functions. Further, the program may be a so-called differential file (differential program) capable of implementing the above-described functions in combination with a program already recorded on the computer.

A device including the image processing unit 306, the image capturing unit 307, the communication unit 308, and the posture detection unit 310 as a minimum configuration corresponds to an aspect of the image capturing device of the present invention. For example, the image processing unit 306 corresponds to an image processing unit in the image capturing device of the present invention, the image capturing unit 307 corresponds to an image capturing element in the image capturing device of the present invention, the communication unit 308 corresponds to a communication unit in the image capturing device of the present invention, and the posture detection unit 310 corresponds to a posture detection unit in the image capturing device of the present invention.

Figure 3:
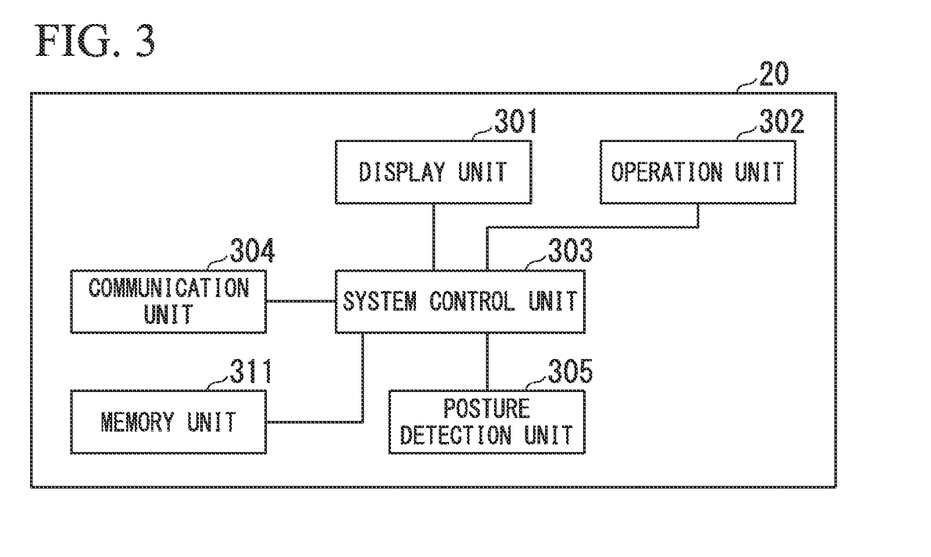
FIG. 3 is a block diagram illustrating a configuration of a display device according to the embodiment of the present invention.

FIG. 3 illustrates a configuration of the display device 20. The display device 20 includes a display unit 301, an operation unit 302, a system control unit 303, a communication unit 304, a posture detection unit 305, and a memory unit 311.

The display unit 301 is a display interface (a display module or a display device) configured to have two-dimensionally arrayed pixels and display an image based on image capturing data wirelessly received from the image capturing device 10. The array of the pixels in the display unit 301, for example, is a rectangular array. The operation unit 302 is an operation interface (an operation module or an operation device) configured to process an operation from the user based on a key input, a voice input, or the like. The system control unit 303 is a control circuit (a control module or a control device) configured to control the overall system of the display device 20. The memory unit 311 is a recording medium configured to store a control program, size information, etc.

The posture detection unit 305 (second posture detection unit) is a sensor configured to detect the posture of the display unit 301 and output posture information (second posture information) representing the detected posture. The posture detected by the posture detection unit 305 is a rotation angle at which a normal line of a display plane of the display unit 301 is designated as an axis.

The communication unit 304 (second communication unit) is a communication interface (a communication module or a communication device) which wirelessly communicates with the display device 20. More specifically, the communication unit 304 wirelessly transmits the posture information and the size information to the image capturing device 10 and wirelessly receives the image capturing data from the image capturing device. In addition, the communication unit 304 wirelessly transmits the shooting instruction to the image capturing device 10 and wirelessly receives captured image capturing data from the image capturing device 10.

For example, a computer (CPU) of the display device 20 reads and executes a program stored in the memory unit 311, and therefore a function of the system control unit 303 is implemented as a software function. An implementation form of the program is similar to an implementation form of the program which implements the function of the camera control unit 309.

A device including the display unit 301, the communication unit 304, and the posture detection unit 305 as a minimum configuration corresponds to an aspect of the display device of the present invention. For example, the display unit 301 corresponds to a display unit in the display device of the present invention, the communication unit 304 corresponds to a communication unit in the display device of the present invention, and the posture detection unit 305 corresponds to a posture detection unit in the display device of the present invention.

Figure 4:
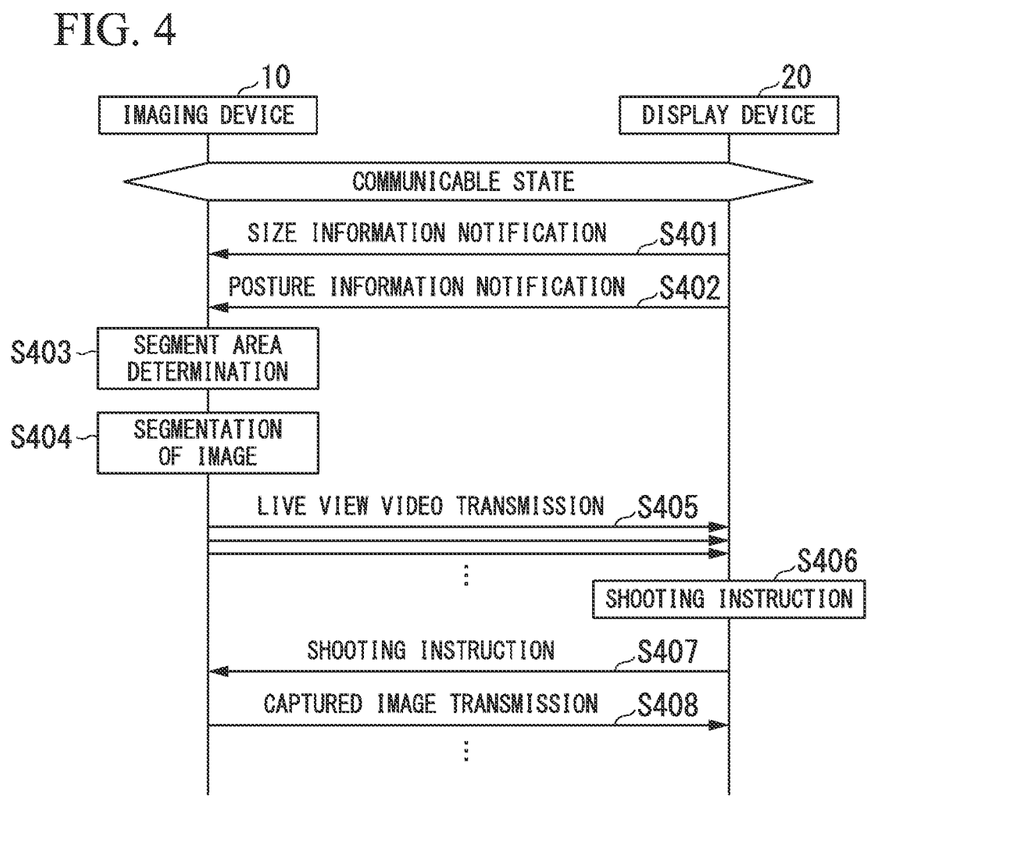
FIG. 4 is a sequence diagram illustrating a procedure of an operation of an image capturing system according to the embodiment of the present invention.

Next, an operation of the image capturing system according to this embodiment will be described. FIG. 4 illustrates an operation of the overall image capturing system.

The image capturing device 10 and the display device 20 join the same network and are in a state in which they can communicate with each other. In this embodiment, for example, a network is formed according to a wireless local area network (LAN) scheme.

The image capturing device 10 starts to capture a live view video when activated. In the capturing of the live view video, the image capturing unit 307 of the image capturing device 10 iterates image capturing in a predetermined cycle. The display device 20 notifies the image capturing device 10 of size information (step S401). The size information of this embodiment is information about the size of the array of the pixels provided in the display unit 301, and is, for example, a screen size (the number of vertical pixels and the number of horizontal pixels) or an aspect ratio (a ratio between the number of vertical pixels and the number of horizontal pixels) of the display unit 301, or the like.

Further, the display device 20 notifies the image capturing device 10 of posture information based on the posture of the display unit 301 detected by the posture detection unit 305 (step S402). In order to obtain an image suitable for the display unit 301, the image capturing device 10 determines an area (segment area) for segmenting an image based on the size information and the posture information of the notification from the display device 20 and the posture information based on the posture of the image capturing element detected by its own posture detection unit 310 (step S403). Further, the image capturing device 10 segments data corresponding to the segment area from the image capturing data generated by the image capturing unit 307 and generates image capturing data for a display (step S404).

The image capturing device 10 wirelessly transmits image capturing data (a live view video) corresponding to a segment area to the display device 20 (step S405). The process of steps S402 to S405 is iteratively performed in synchronization with a cycle of image capturing to be performed by the image capturing unit 307. In FIG. 4, the iteration of the process of steps S402 to S404 is omitted.

When the user has input a shooting instruction (release instruction) via the operation unit 302 of the display device 20 (step S406), the display device 20 notifies the image capturing device 10 of the shooting instruction (step S407). As in the process of generating image capturing data corresponding to the live view video, the image capturing device 10 notified of the shooting instruction performs image capturing, determines a segment area for the image capturing data generated by the image capturing unit 307, and generates image capturing data corresponding to the segment area. Immediately before this process, notification of posture information from the display device 20 is also provided. The image capturing device 10 wirelessly transmits the generated image capturing data (captured image) to the display device 20 (step S408). The display device 20 wirelessly receives the image capturing data and displays an image based on the image capturing data on the display unit 301 or records the image capturing data on the memory unit 311.

In the above-described operation, the display device 20 iteratively notifies the image capturing device 10 of the posture information. The image capturing device 10 iteratively detects the posture of the image capturing unit 307 and determines a segment area suitable for the display unit 301 of the display device 20.

Figure 5:
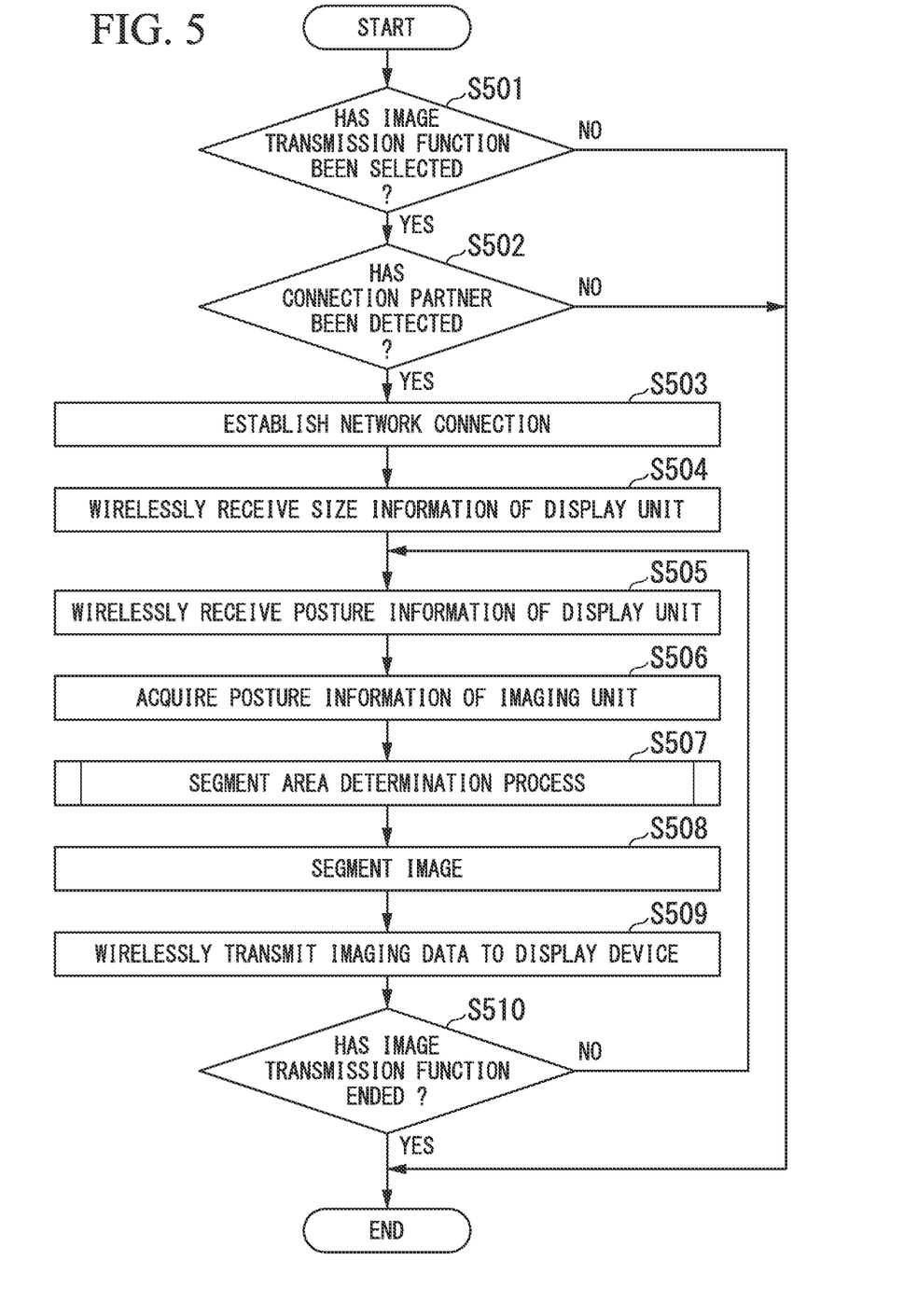
FIG. 5 is a flowchart illustrating a procedure of an operation of the image capturing device according to the embodiment of the present invention.

FIG. 5 illustrates an operation of the image capturing device 10. After the image capturing device 10 has been powered on, the camera control unit 309 determines whether to use a function (image transmission function) of establishing a connection with the display device 20 via the network and transmitting an image (step S501). The determination of whether to use the image transmission function, for example, is made based on an instruction input by the user. When the image capturing device 10 does not have a user input function, the use of the image transmission function is set at the time of shipment from a factory, and the process of step S502 may be executed without determining whether to use the image transmission function after power is applied.

When the image transmission function is not used, the image capturing device 10 ends an operation. When the image transmission function is used, the image capturing unit 307 starts image capturing. In addition, the camera control unit 309 controls the communication unit 308 to search for a connection partner (step S502). When the display device 20 which is the connection partner has not been detected, the image capturing device 10 ends the operation. In addition, when the display device 20 has been detected, the camera control unit 309 controls the communication unit 308 to establish a network connection with the display device 20 (step S503).

After the network connection has been completed, the camera control unit 309 controls the communication unit 308 to wirelessly receive the size information of the display unit 301 from the display device 20 (step S504). After the wireless reception of the size information, the camera control unit 309 controls the communication unit 308 to wirelessly receive the posture information of the display unit 301 from the display device 20 (step S505).

After the wireless reception of the posture information of the display unit 301, the camera control unit 309 acquires the posture information of the image capturing unit 307 from the posture detection unit 310 (step S506). After the acquisition of the posture information of the image capturing unit 307, the camera control unit 309 controls the image processing unit 306 to perform a segment area determination process of determining a segment area based on the size information and the posture information wirelessly received from the display device 20 and the posture information of the image capturing unit 307 (step S507). Details of the segment area determination process will be described later. Although not illustrated in FIG. 5, the segment area determination process is performed both when the live view video is transmitted and when notification of the shooting instruction is provided from the display device 20.

After the determination of the segment area, the camera control unit 309 controls the image processing unit 306 to segment data corresponding to the determined segment area from the image capturing data generated by the image capturing unit 307 and generate image capturing data for transmission (step S508). After the generation of the image capturing data, the camera control unit 309 controls the communication unit 308 to wirelessly transmit the generated image capturing data to the display device 20 (step S509).

An image size of the image capturing data to be transmitted, for example, is close to Video Graphics Array (VGA) (640×480) in order to suppress the data size in the case of the live view video, and is an obtainable maximum size when notification of the shooting instruction has been provided.

After the wireless transmission of the image capturing data, the camera control unit 309 determines whether to end the image transmission function (step S510). When the image transmission function ends according to an instruction or the like from the user, the image capturing device 10 ends the operation. In addition, when the image transmission function does not end, the camera control unit 309 iterates the process by returning to the process (step S505) of wirelessly receiving the posture information from the display device 20.

Figure 6:
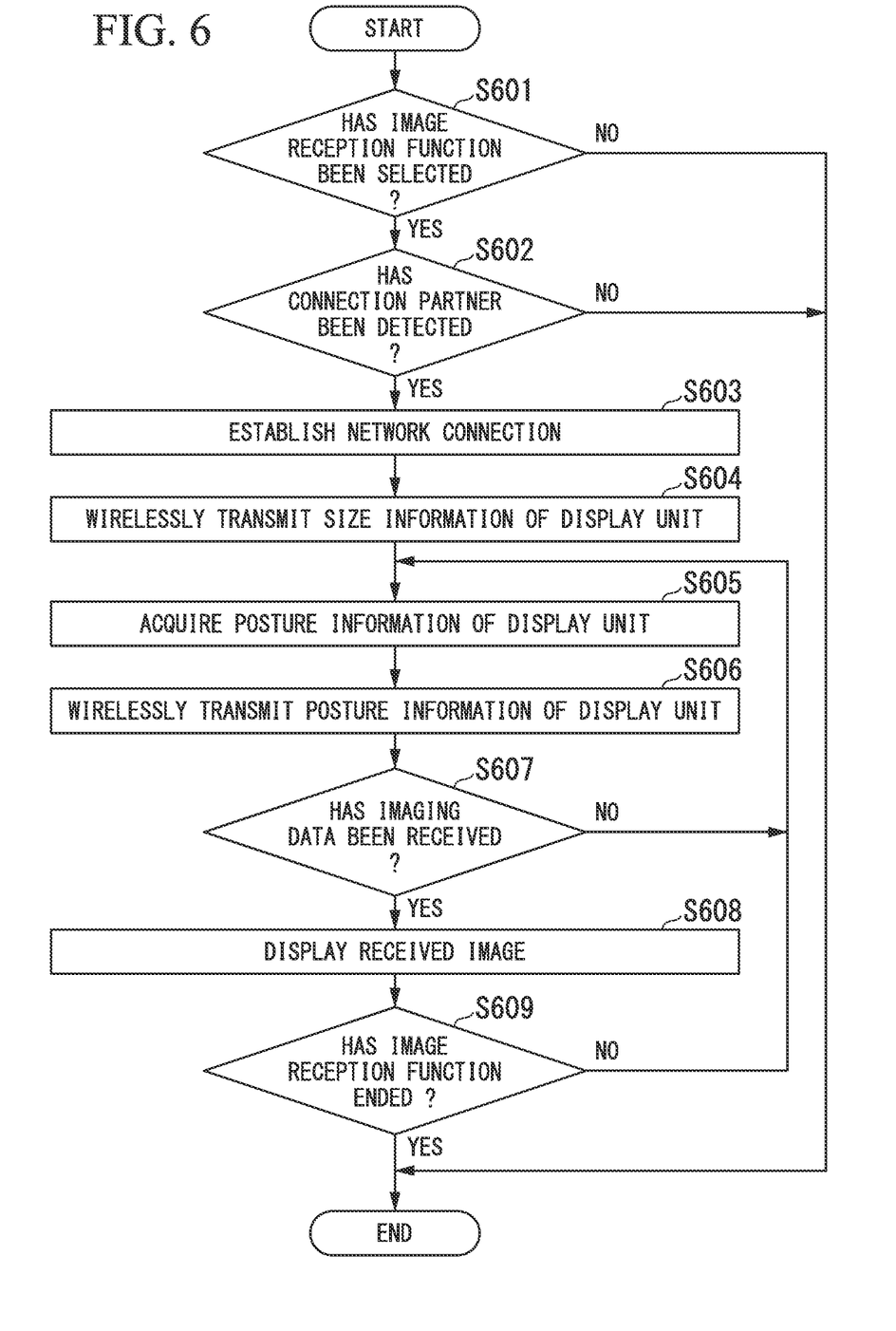
FIG. 6 is a flowchart illustrating a procedure of an operation of the display device according to the embodiment of the present invention.

FIG. 6 illustrates an operation of the display device 20. After the display device 20 has been powered on, the system control unit 303 determines whether to use a function (image reception function) of receiving an image by connecting to the image capturing device 10 via the network (step S601). The determination of whether to use the image reception function is made based on an instruction input by the user. In addition, the use of the image reception function is set at the time of shipment from the factory, and the process of step S602 may be executed without determining whether to use the image reception function after power is applied.

When the image reception function is not used, the display device 20 ends an operation. When the image reception function is used, the system control unit 303 controls the communication unit 304 to search for a connection partner (step S602). When the image capturing device 10 which is the connection partner has not been detected, the display device 20 ends the operation.

In addition, when the image capturing device 10 has been detected, the system control unit 303 controls the communication unit 304 to establish a network connection with the image capturing device 10 (step S603).

After the network connection has been completed, the system control unit 303 controls the communication unit 304 to wirelessly transmit size information of the display unit 301 on the image capturing device 10 (step S604). The size information, for example, is stored in the memory unit 311. After the wireless transmission of the size information, the system control unit 303 acquires posture information of the display unit 301 from the posture detection unit 305 (step S605). After the acquisition of the posture information of the display unit 301, the system control unit 303 controls the communication unit 304 to wirelessly transmit posture information of the display unit 301 on the image capturing device 10 (step S606).

After the wireless transmission of the posture information, the system control unit 303 is in a reception waiting state for image capturing data (step S607). When the image capturing data has been wirelessly received from the image capturing device 10, the system control unit 303 displays an image on the display unit 301 based on the received image capturing data (step S608). In addition, when the image capturing data has not been received from the image capturing device 10, the system control unit 303 iterates the process by returning to the process of acquiring the posture information of the display unit 301 (step S605).

After the wireless reception of the image capturing data, the system control unit 303 determines whether to end the image reception function (step S609). When the image reception function ends according to an instruction or the like from the user, the display device 20 ends the operation. In addition, when the image reception function does not end, the system control unit 303 iterates the process by returning to the process of acquiring the posture information of the display unit 301 (step S605).

Figure 7:
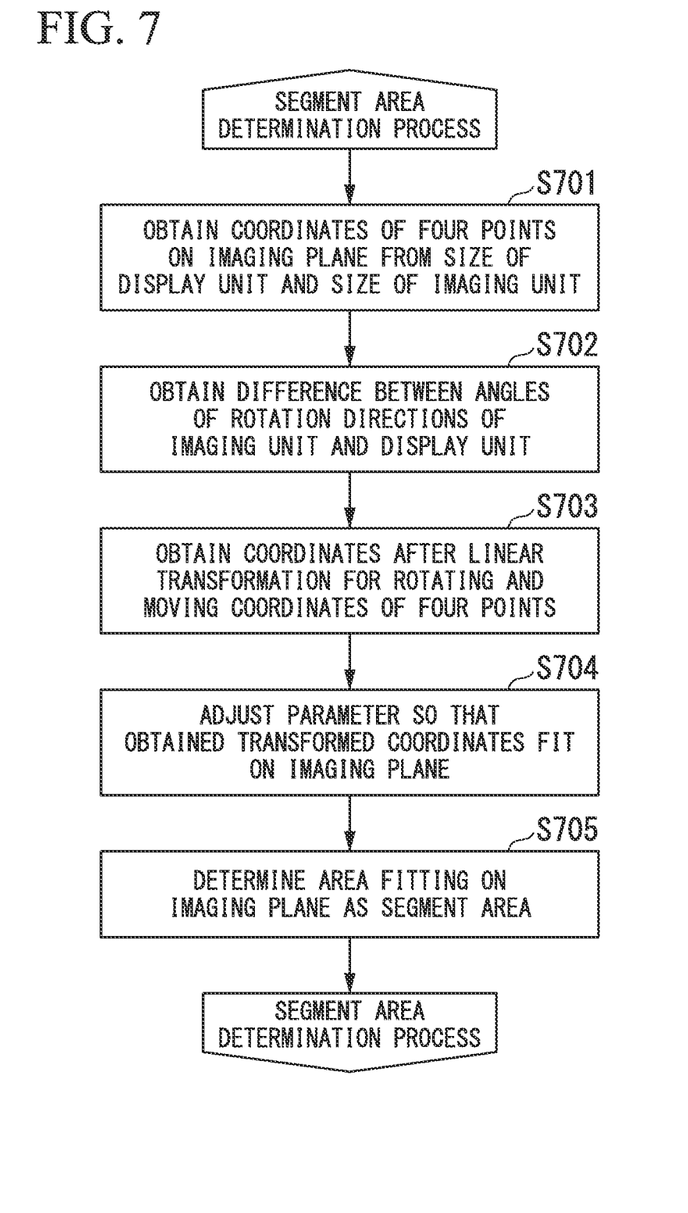
FIG. 7 is a flowchart illustrating a procedure of an operation of the image capturing device according to the embodiment of the present invention.

FIG. 7 illustrates an operation of the image capturing device 10 in the segment area determination process (step S507). As shown below, the image processing unit 306 determines a segment image area to be within an overall area of an image based on image capturing data generated by the image capturing unit 307.

First, the image processing unit 306 calculates coordinates of four points on an image capturing plane of the image capturing element based on a size of the display unit 301 represented by size information of the display unit 301 wirelessly received from the display device 20 and a size of the image capturing element included in the image capturing unit 307 (step S701). The coordinates of the four points are coordinates of positions corresponding to an aspect ratio of the display unit 301.

Figure 8:
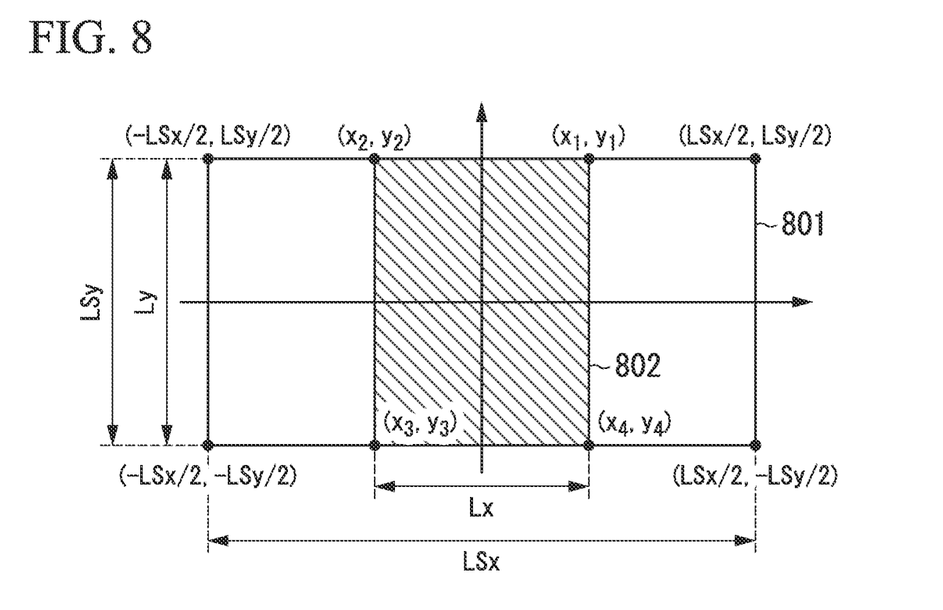
FIG. 8 is a reference diagram illustrating a segment area determination process in the embodiment of the present invention.

FIG. 8 illustrates coordinates calculated in step S701. In FIG. 8, an image capturing plane 801 of the image capturing element included in the image capturing unit 307 overlaps a segment area 802 which is a range of an image to be segmented according to an aspect ratio of the display unit 301. The image capturing plane 801 corresponds to an overall area (effective pixel area) of an image based on image capturing data generated by the image capturing element. Center coordinates of the image capturing plane 801 and the segment area 802 are consistent. The horizontal direction of FIG. 8 is an X direction and the vertical direction of FIG. 8 is a Y direction.

Lengths of the X direction and the Y direction of the segment area 802 are defined as follows.

Length of X direction=Lx
Length of Y direction=Ly

In addition, the aspect ratio of the display unit 301 is defined as follows.

Vertical Ly:Horizontal Lx=V:H

The following Equation (1) is established from the above-described definitions.

$$Ly=(V/H)\times Lx \quad (1)$$

Therefore, coordinates $(x_n, y_n)$ (n=1 to 4) of four points of the rectangular segment area 802 overlapping on the image capturing plane 801 are represented by the following Equations (2) to (5).

$$(x_1, y_1)=(Lx/2, (V/H)\times Lx) \quad (2)$$

$$(x_2, y_2)=(-Lx/2, (V/H)\times Lx) \quad (3)$$

$$(x_3, y_3)=(-Lx/2, -(V/H)\times Lx) \quad (4)$$

$$(x_4, y_4)=(Lx/2, -(V/H)\times Lx) \quad (5)$$

After the calculation of the coordinates of the four points, the image processing unit 306 obtains an angle difference of the rotation direction based on a difference between a posture of the image capturing unit 307 of the image capturing device 10 and a posture of the display unit 301 of the display device 20 (step S702).

Figure 9:
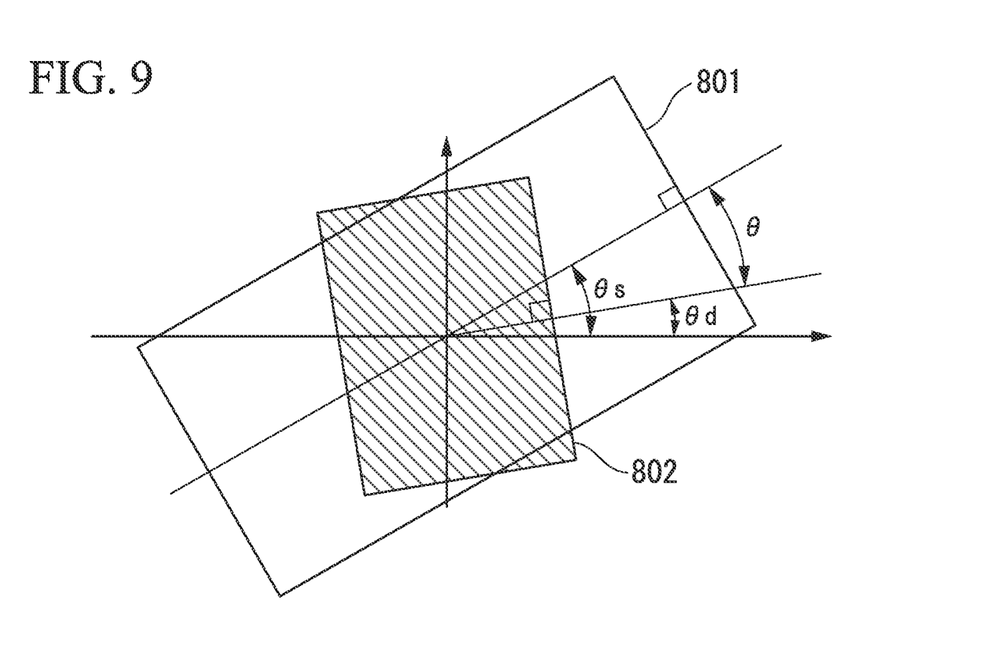
FIG. 9 is a reference diagram illustrating the segment area determination process in the embodiment of the present invention.

FIG. 9 illustrates the rotation angle of the image capturing plane 801 relative to an optical axis of the image capturing plane 801 and the rotation angle of the segment area 802 relative to a normal line of a display plane of the display unit 301. In FIG. 9, the image capturing plane 801 and the segment area 802 overlap and the center coordinates of the image capturing plane 801 and the segment area 802 are consistent. The horizontal direction of FIG. 9 is an X direction and the vertical direction of FIG. 9 is a Y direction. As illustrated in FIG. 9, when the rotation angle of the image capturing plane 801 relative to a reference direction (X direction) is defined as θs and the rotation angle of the display unit 301 relative to the reference direction is defined as θd, an obtained angle difference θ of the rotation direction is represented by the following Equation (6).

$$\theta=\theta s-\theta d \quad (6)$$

After the angle difference θ of the rotation direction is obtained, the image processing unit 306 obtains coordinates after linear transformation for rotating and moving the coordinates of the four points obtained in step S701 by the angle difference θ (step S703). The coordinates after the linear transformation based on rotational movement can be obtained from the following formula (Equation (7)) for moving coordinates (X, Y) to coordinates (X', Y') by rotating the coordinates (X, Y) by the angle θ.

$$\begin{pmatrix} X' \\ Y' \end{pmatrix} = \begin{pmatrix} \cos\theta & -\sin\theta \\ \sin\theta & \cos\theta \end{pmatrix}\begin{pmatrix} X \\ Y \end{pmatrix} \quad (7)$$

Using the above-described Equation (7), coordinates $(X_n', Y_n')$ (n=1 to 4) of the four points after the linear transformation are represented as in the following Equations (8) to (11).

$$\begin{pmatrix} X_1' \\ Y_1' \end{pmatrix} = \begin{pmatrix} \cos\theta & -\sin\theta \\ \sin\theta & \cos\theta \end{pmatrix}\begin{pmatrix} Lx/2 \\ (V/H)\times Lx \end{pmatrix} \quad (8)$$

$$\begin{pmatrix} X_2' \\ Y_2' \end{pmatrix} = \begin{pmatrix} \cos\theta & -\sin\theta \\ \sin\theta & \cos\theta \end{pmatrix}\begin{pmatrix} -Lx/2 \\ (V/H)\times Lx \end{pmatrix} \quad (9)$$

$$\begin{pmatrix} X_3' \\ Y_3' \end{pmatrix} = \begin{pmatrix} \cos\theta & -\sin\theta \\ \sin\theta & \cos\theta \end{pmatrix}\begin{pmatrix} -Lx/2 \\ -(V/H)\times Lx \end{pmatrix} \quad (10)$$

$$\begin{pmatrix} X_4' \\ Y_4' \end{pmatrix} = \begin{pmatrix} \cos\theta & -\sin\theta \\ \sin\theta & \cos\theta \end{pmatrix}\begin{pmatrix} Lx/2 \\ -(V/H)\times Lx \end{pmatrix} \quad (11)$$

After the coordinates after the linear transformation have been obtained, the image processing unit 306 adjusts a value of a parameter Lx so that the coordinates $(X_n', Y_n')$ after the above-described linear transformation are included in a range of the image capturing plane 801 (step S704). A size of the image capturing plane 801 illustrated in FIG. 8 is defined as follows.

Length of X direction=LSx
Length of Y direction=LSy

It is possible to obtain a desired value by adjusting a value of the parameter Lx so that the coordinates $(X_n', Y_n')$ obtained by the linear transformation satisfy the conditions of the following Equations (12) and (13).

$$-LSx/2 \leq X_n' \leq LSx/2 (n=1 \text{ to } 4) \quad (12)$$

$$-LSy/2 \leq Y_n' \leq LSy/2 (n=1 \text{ to } 4) \quad (13)$$

Figure 10:
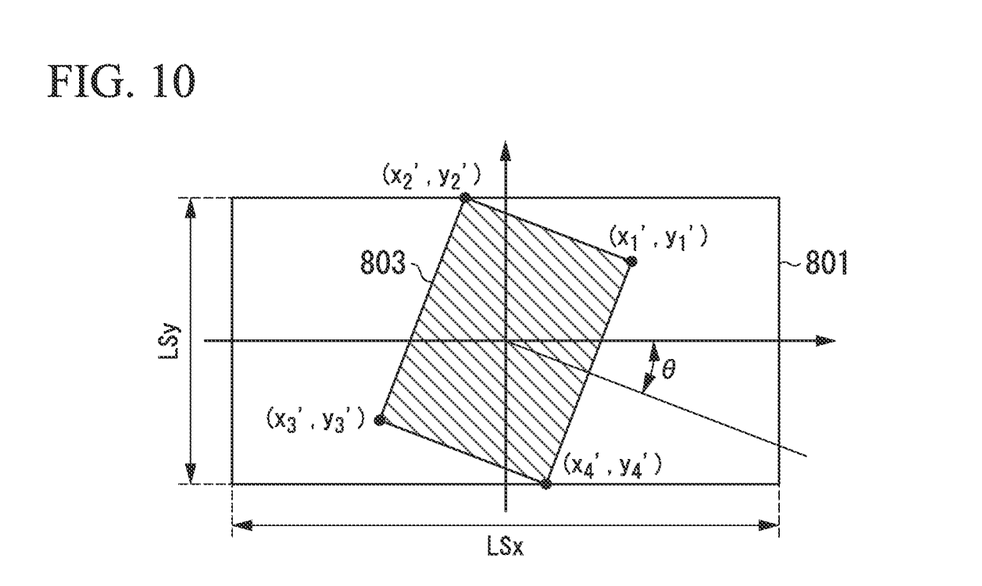
FIG. 10 is a reference diagram illustrating the segment area determination process in the embodiment of the present invention.

After the adjustment of the value of the parameter Lx, the image processing unit 306 calculates a maximum value of Lx satisfying the conditions of the above-described Equations (12) and (13) and determines values of the coordinates $(X_n', Y_n')$ (n=1 to 4). FIG. 10 illustrates the coordinates $(X_n', Y_n')$ determined according to the above process. In FIG. 10, the image capturing plane 801 overlaps a segment area 803 obtained by performing the above-described adjustment on the segment area 802 in FIG. 8. The center coordinates of the image capturing plane 801 and the segment area 803 are consistent. The horizontal direction of FIG. 10 is the X direction and the vertical direction of FIG. 10 is the Y direction.

In FIG. 10, the difference θ between the rotation angles of the image capturing plane 801 and the segment area 803 is the value obtained in step S702. In addition, the segment area 803 is within the image capturing plane 801 so that the segment area 803 does not protrude from the image capturing plane 801. The image processing unit 306 determines a rectangular area in which the coordinates $(X_n', Y_n')$ (n=1 to 4) illustrated in FIG. 10 serve as a vertex as an ultimate image segment area (step S705).

As described above, the image processing unit 306 sets a first image area (segment area 802) corresponding to the size represented by the size information wirelessly received from the display device 20 in an overall area (image capturing plane 801) of an image based on the image capturing data generated by the image capturing element (corresponding to step S701). In addition, the image processing unit 306 sets a second image area (segment area 803) obtained by rotating the first image area (segment area 802) in the overall area (image capturing surface 801) according to a difference (difference θ) between the posture of the image capturing element estimated from the posture information output from the posture detection unit 310 and the posture of the display unit 301 estimated from the posture information wirelessly received from the display device 20 (corresponding to step S705). Further, the image processing unit 306 generates image capturing data for a display by segmenting data corresponding to the second image capturing area (segment area 803) from the image capturing data generated by the image capturing element (corresponding to step S508). The second image area (segment area 803) is an image area obtained by rotating the first image area (segment area 802) and reducing the first image area (segment area 802) after the rotation so that the first image area (segment area 802) after the rotation is within the overall area (image capturing plane 801).

Although a difference between elevation angles of the image capturing element and the display unit 301 is disregarded in the above description, for example, it is only necessary to perform the above-described process after correcting the elevation angles (position adjustment of the vertical directions of the image capturing plane and the segment area).

As described above, according to this embodiment, the image capturing device 10 generates image capturing data by segmenting data corresponding to an image area corresponding to the size of the display unit 301 from the image capturing data generated by the image capturing element according to a difference between the posture of the image capturing element and the posture of the display unit 301 of the display device 20. Thereby, it is possible to obtain an image with a tilt adjusted according to the difference between the postures of the image capturing device 10 and the display device 20. Therefore, it is possible to obtain an image in which the sense of visual incompatibility given to the user is reduced.

In addition, it is possible to obtain a segment area of a maximum area according to the difference between the postures of the image capturing device 10 and the display device 20 according to the segment area determination process (step S507).

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An image capturing device comprising:
an image capturing element configured to perform image capturing to generate first image capturing data;
a posture detection unit configured to detect a posture of the image capturing element to output first posture information;
a communication unit configured to wirelessly receive second posture information about a posture of a display unit, in which pixels are two-dimensionally arrayed, and size information about a size of an array of the pixels from a display device having the display unit, the communication unit wirelessly transmitting second image capturing data generated from the first image capturing data to the display device; and
an image processing unit configured to generate the second image capturing data by segmenting data, which corresponds to an image area corresponding to the size represented by the size information, from the first image capturing data according to a difference between the posture of the image capturing element estimated from the first posture information and the posture of the display unit estimated from the second posture information.

2. The image capturing device according to claim 1, wherein the image processing unit determines the image area to be within an overall area of an image based on the first image capturing data.

3. The image capturing device according to claim 2, wherein the image processing unit sets a first image area corresponding to the size represented by the size information in the overall area of the image based on the first image capturing data, sets a second image area obtained by rotating the first image area in the overall area according to the difference between the posture of the image capturing element estimated from the first posture information and the posture of the display unit estimated from the second posture information, and generates the second image capturing data by segmenting data corresponding to the second image area from the first image capturing data.

4. The image capturing device according to claim 3, wherein the second image area is an image area obtained by rotating the first image area and reducing the first image area after the rotation so that the first image area after the rotation is within the overall area.

5. An image capturing system comprising:
an image capturing device; and
a display device having a display unit in which pixels are two-dimensionally arrayed,
wherein the image capturing device includes:
an image capturing element configured to perform image capturing to generate first image capturing data;
a first posture detection unit configured to detect a posture of the image capturing element to output first posture information;
a first communication unit configured to wirelessly receive second posture information about a posture of the display unit and size information about a size of an array of the pixels from the display device, the first communication unit wirelessly transmitting second image capturing data generated from the first image capturing data to the display device;
an image processing unit configured to generate the second image capturing data by segmenting data, which corresponds to an image area corresponding to the size represented by the size information, from the first image capturing data according to a difference between the posture of the image capturing element estimated from the first posture information and the posture of the display unit estimated from the second posture information, and
wherein the display device includes:
a second communication unit configured to wirelessly transmit the second posture information and the size information to the image capturing device, the second communication unit wirelessly receiving the second image capturing data from the image capturing device;

the display unit configured to display an image based on the second image capturing data; and a second posture detection unit configured to detect the posture of the display unit and output the second posture information.

6. An image capturing method comprising the steps of:

detecting, by a second communication unit of a display device having a display unit in which pixels are two-dimensionally arrayed, a posture of the display unit, and wirelessly transmitting second posture information output from a second posture detection unit configured to output the second posture information about the posture of the display unit and size information about a size of an array of the pixels to an image capturing device;

wirelessly receiving, by a first communication unit of the image capturing device, the second posture information and the size information from the display device;

detecting a posture of an image capturing element of the image capturing device and generating, by an image processing unit of the image capturing device, second image capturing data by segmenting data, which corresponds to an image area corresponding to the size represented by the size information, from first image capturing data generated by the image capturing element according to a difference between a posture of the image capturing element estimated from the first posture information output from the posture detection unit configured to output the first posture information and a posture of the display unit estimated from the second posture information;

wirelessly transmitting, by the first communication unit of the image capturing device, the second image capturing data to the display device;

wirelessly receiving, by the second communication unit of the display device, the second image capturing data from the image capturing device; and displaying, by the display unit of the display device, an image based on the second image capturing data.

7. A non-transitory computer readable storage medium storing a program for causing a computer to execute the steps of: causing a communication unit to wirelessly receive second posture information about a posture of a display unit and size information about a size of an array of pixels from a display device having the display unit in which the pixels are two-dimensionally arrayed; causing an image processing unit to detect a posture of an image capturing element and generate second image capturing data by segmenting data, which corresponds to an image area corresponding to the size represented by the size information, from first image capturing data generated by the image capturing element according to a difference between the posture of the image capturing element estimated from first posture information output from a posture detection unit configured to output the first posture information and the posture of the display unit estimated from the second posture information; and causing the communication unit to wirelessly transmit the second image capturing data to the display device.

* * * * *